United States Patent
Tsai et al.

(10) Patent No.: US 6,697,533 B1
(45) Date of Patent: Feb. 24, 2004

(54) FILTERING CIRCUIT FOR IMAGE SIGNAL PROCESSING

(75) Inventors: Jiann-Jong Tsai, YungKang (TW); Li-ming Chen, Keelung (TW)

(73) Assignee: Sunplus Technology Co., Ltd. (TW)

(*) Notice: Subject to any disclaimer, the term of this patent is extended or adjusted under 35 U.S.C. 154(b) by 0 days.

(21) Appl. No.: 09/534,173

(22) Filed: Mar. 24, 2000

(51) Int. Cl.⁷ .................................................. G06K 9/40
(52) U.S. Cl. ...................................... 382/260; 382/265
(58) Field of Search ............................. 382/260–266, 382/254, 240, 248, 232–233; 375/240.18–240.19, 240.11, 229–232; 708/300–323, 203

(56) References Cited

U.S. PATENT DOCUMENTS 5,260,888 A * 11/1993 Sharman .................... 708/308
5,838,377 A * 11/1998 Greene ................... 375/240.11
5,984,514 A * 11/1999 Greene et al. ............. 708/203
6,314,132 B1 * 11/2001 Liu et al. ..................... 375/229

* cited by examiner

*Primary Examiner*—Leo Boudreau
*Assistant Examiner*—Ishrat Sherali
(74) *Attorney, Agent, or Firm*—Lowe Hauptman Gilman & Berner, LLP

(57) ABSTRACT

A filtering circuit for image signal processing has a high frequency filtering circuit and a low frequency filtering circuit. The high frequency filtering circuit only includes one adder to obtain a high frequency component. The low frequency filtering circuit includes one adder and utilizes the high frequency component generated by the high frequency filtering circuit to obtain a low frequency component.

8 Claims, 4 Drawing Sheets

FILTERING CIRCUIT FOR IMAGE SIGNAL PROCESSING

BACKGROUND OF THE INVENTION

1. Field of the Invention

The present invention relates to a filtering circuit and, more particularly, to a filtering circuit with simplified structure for image signal processing.

2. Description of Related Art

Generally, in the image signal compression process which employs, for example, a wavelet filter to process image signals, as shown in FIG. 3, image signals must be stored first, and then applied to a high frequency filter 31 and a low frequency filter 32 to perform filtering and down sampling processes. Therefore, an input image signal line 33 with 2N length is converted into N high frequency signal points and N low frequency signal points. These high and low frequency signals are then respectively encoded and compressed.

It is known that a digital filter is provided to perform an operation expressed by the following equation:

$$y_n = \sum_{i=0}^{N-1} c_i x_{n-i},$$

where N is the order of a filter, $x_n$ is the n-th input, $y_n$ is the n-th output, and $c_i$ (i=0 . . . N−1) is the constant coefficient of the filter. The coefficient of the above high frequency filter 31 is (0, 1, −2, 1, 0), and the coefficient of the low frequency filter 32 is (−1, 2, 6, 2, −1). Therefore, the high frequency filter 31 can be described by an equation as follows:

$$H_{2n} = X_{2n} - 2X_{2n-1} + X_{2n-2}.$$

The equation that describes the low frequency filter 32 is:

$$L_{2n} = -X_{2n} + 2X_{2n-1} + 6X_{2n-2} + 2X_{2n-3} - X_{2n-4}.$$

Based on the above equations, a typical architecture for processing the high and low frequency signals of a 3–5 (3 stages and 5 levels) wavelet filter is shown in FIG. 4. As shown, in a first stage, an input image signal is first filtered to produce a high frequency component y1$d$ and a low frequency component y1$a$. Next, in a second stage, the low frequency component y1$a$ is further filtered to produce a high frequency component y2$d$ and a low frequency component y2$a$. Then, in a third stage, the low frequency component y2$a$ is further filtered to produce a high frequency component y3$d$ and a low frequency component y3$a$. In such a filtering process, the high and low frequency signals are processed separately such that different hardware architectures are required to process the high and low frequency signals. Practically, in each individual stage, five registers 41 are required to hold and delay the image signals, and eight shift adders 42 are required to multiply filtering coefficients and input values for performing filtering operations. Thus, a total of 5×3=15 registers and 8×3=24 adders are required. In view of the foregoing, such a conventional filtering architecture employs too many registers and adders, and thus the circuit design is complicated and the manufacturing cost is high.

U.S. Pat. No. 5,838,377 entitled "Video Compressed Circuit Using Recursive Wavelet Filtering" discloses a filtering architecture in which the number of adders is reduced. Under the same processing condition as the above example, there are only 5×3=15 adders required. However, the number of registers required to perform the filtering operation is not reduced so that the simplification in hardware architecture is not satisfactory. Therefore, there is a need to have a novel filtering circuit to mitigate and/or obviate the aforementioned problems.

SUMMARY OF THE INVENTION

It is therefore an object of the present invention to provide a filtering circuit for image signal processing which utilizes the high frequency component to obtain the high frequency component, and employing a small amount of adders to perform the filtering operation, thereby effectively simplifying the circuit structure.

To achieve the above object, a filtering circuit is provided for performing a high pass filtering and a low pass filtering on a plurality of input image data to obtain a high frequency component and a low frequency component corresponding to a current input image data. In the filtering circuit, a first latch is provided for holding the input image data and outputting the same. A first adder is provided for performing an addition of a previous input image data and a previous second input image data in a first operating cycle to obtain a first operation value, and performing an addition of the first operation value and a current input image data in a second operating cycle to obtain a corresponding high frequency component. A second latch is provided for holding the first operation value and the high frequency component from the first adder and outputting the same. A second adder is provided for performing an addition of a previous second high frequency component output from the second latch and the previous second input image data in the first operating cycle to obtain a second operation value, and performing an addition of the second operation value and a current high frequency component obtained in the first adder in the second operating cycle to obtain a corresponding low frequency component. A third latch is provided for holding the second operation value and outputting the same.

The above and other objects, features and advantages of the present invention will become apparent from the following detailed description taken with the accompanying drawings.

DETAILED DESCRIPTION OF THE PREFERRED EMBODIMENTS

Figure 1:
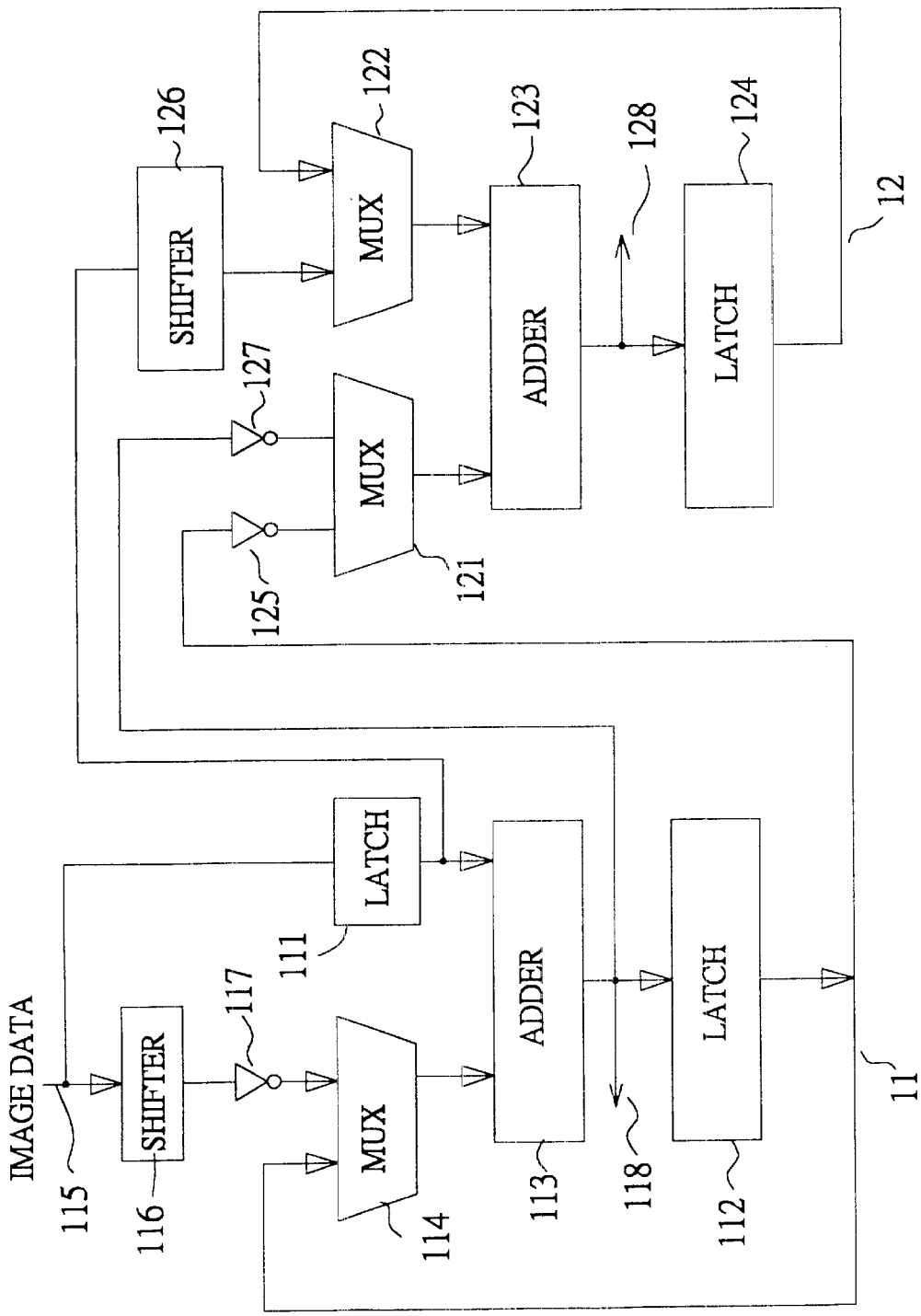
FIG. 1 schematically illustrates a filtering circuit for image signal processing in accordance with the present invention.

Referring to FIG. 1, there is shown a filtering circuit for image signal processing in accordance with a preferred embodiment of the present invention. In this exemplary 3–5 filter, the high frequency component and low frequency component are respectively expressed as follows:

$$H_{2n} = X_{2n} - 2X_{2n-1} + X_{2n-2},$$

$$L_{2n} = -X_{2n} + 2X_{2n-1} + 6X_{2n-2} + 2X_{2n-3} - X_{2n-4},$$

wherein, the low frequency component can be rewritten as follows:

$$L_{2n} = 8X_{2n-2} - X_{2n} + 2X_{2n-1} - X_{2n-2} - X_{2n-2} + 2X_{2n-3} - X_{2n-4}$$

$$= 8X_{2n-2} - (X_{2n} - 2X_{2n-1} + X_{2n-2}) - (X_{2n-2} - 2X_{2n-3} + X_{2n-4})$$

$$= 8X_{2n-2} - H_{2n} - H_{2n-2}.$$

In view of above, the low frequency component can be obtained from processing the high frequency components, and thus the circuit structure of the filter and the filtering process can be simplified. FIG. 1 shows a filtering circuit of the present invention based on using the high frequency components to obtain the low frequency component. The filtering circuit includes a high frequency filtering circuit 11 and a low frequency filtering circuit 12 for performing a high pass filtering and a low pass filtering on a plurality of image data, so as to obtain the high frequency component $H_{2n}$ and low frequency component $L_{2n}$ corresponding to a current input image data $X_{2n}$.

The high frequency filtering circuit 11 includes a first latch 111, a second latch 112, a first adder 113, and a first multiplexer 114. The first latch 111 is provided to hold the image data input from an image input terminal 115 and output the same. The second latch 112 is provided to hold the output value of the first adder 113 and output the same.

When the high frequency filtering circuit 11 performs a filtering operation in a first operating cycle, the first multiplexer 114 selects a previous image data $X_{2n-1}$, supplied from the image input terminal 115, multiplied by a first coefficient (−2) to output to the first adder 113. In this preferred embodiment, the input image data $X_{2n-1}$ is processed by a shifter 116 and an inverter 117 for being multiplied by −2.

The first adder 113 performs an addition between the output $-2X_{2n-1}$ of the first multiplexer 114 and a previous second image data $X_{2n-2}$, output from the first latch 111, for obtaining a first operation value (i.e., $-2X_{2n-1}+X_{2n-2}$), which in turn is hold in the second latch 112.

In the subsequent second operating cycle, the first multiplexer 114 selects the first operation value $-2X_{2n-1}+X_{2n-2}$, hold in the second latch 112, to output to the first adder 113. The first adder 113 then performs an addition between the first operation value $-2X_{2n-1}+X_{2n-2}$ and the current input image data $X_{2n}$, output from the first latch 111, for obtaining a corresponding high frequency component $H_{2n}$. This high frequency component $H_{2n}$ is hold in the second latch 112 and output from an output terminal 118.

The low pass filtering circuit 12 includes a second multiplexer 121, a third multiplexer 122, a second adder 123, and a third latch 124, wherein the third latch 124 is provided to hold the output value of the second adder 123 and output the same.

When the low pass filtering circuit 12 performs a filtering operation in the first operating cycle, the second multiplexer 121 selects a previous second high frequency component $H_{2n-2}$, output from the second latch 112, multiplied by a second coefficient (−1) to output to the second adder 123. In this preferred embodiment, the high frequency component $H_{2n-2}$ is processed by an inverter 117 for being multiplied by −1. Furthermore, the third multiplexer 122 selects a previous second image data $X_{2n-2}$, output from the first latch 111, multiplied by a fourth coefficient (8) to output to the second adder 123. In this preferred embodiment, the image data $X_{2n-2}$ is processed by a shifter 126 for being multiplied by 8.

The second adder 123 performs an addition between the previous second high frequency component $H_{2n-2}$ and the previous second image data $X_{2n-2}$, output from the second multiplexer 121 and the third multiplixer 122, respectively, so as to obtain a second operation value (i.e., $8X_{2n-2}-H_{2n-2}$), which in turn is hold in the third latch 124.

In the second operating cycle, the second multiplexer 121 selects the current high frequency component $H_{2n}$, produced by the first adder 113, multiplied by a third coefficient (−1) to output to the second adder 121. In this preferred embodiment, the high frequency component $H_{2n}$ is processed by an inverter 127 for being multiplied by −1. The third multiplexer 122 selects the second operation value $8X_{2n-2}-H_{2n-2}$, output from the third latch 124, to output to the second adder 123. As a result, the second adder 123 performs an addition between the second operation value $8X_{2n-2}-H_{2n-2}$ and the value $-H_{2n}$ generated by the second multiplexer 121 to obtain a corresponding low frequency component $L_{2n}$. This low frequency component $L_{2n}$ is output from a low frequency component output terminal 128.

Figure 2:
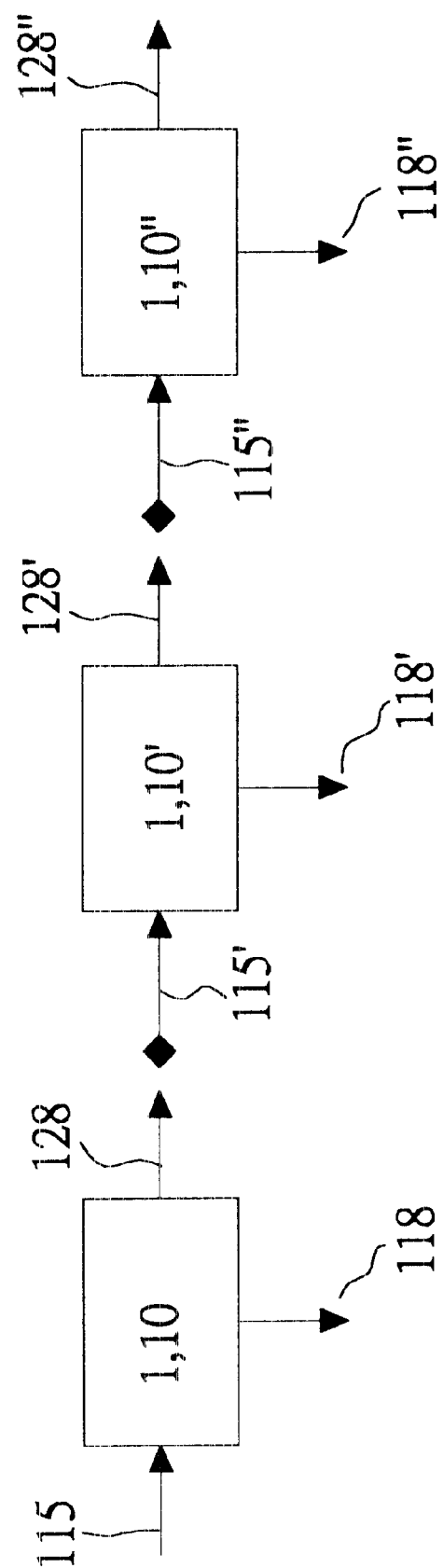
FIG. 2 schematically illustrates a 3–5 filter implemented by the filtering circuits in accordance with the present invention.
Figure 3:
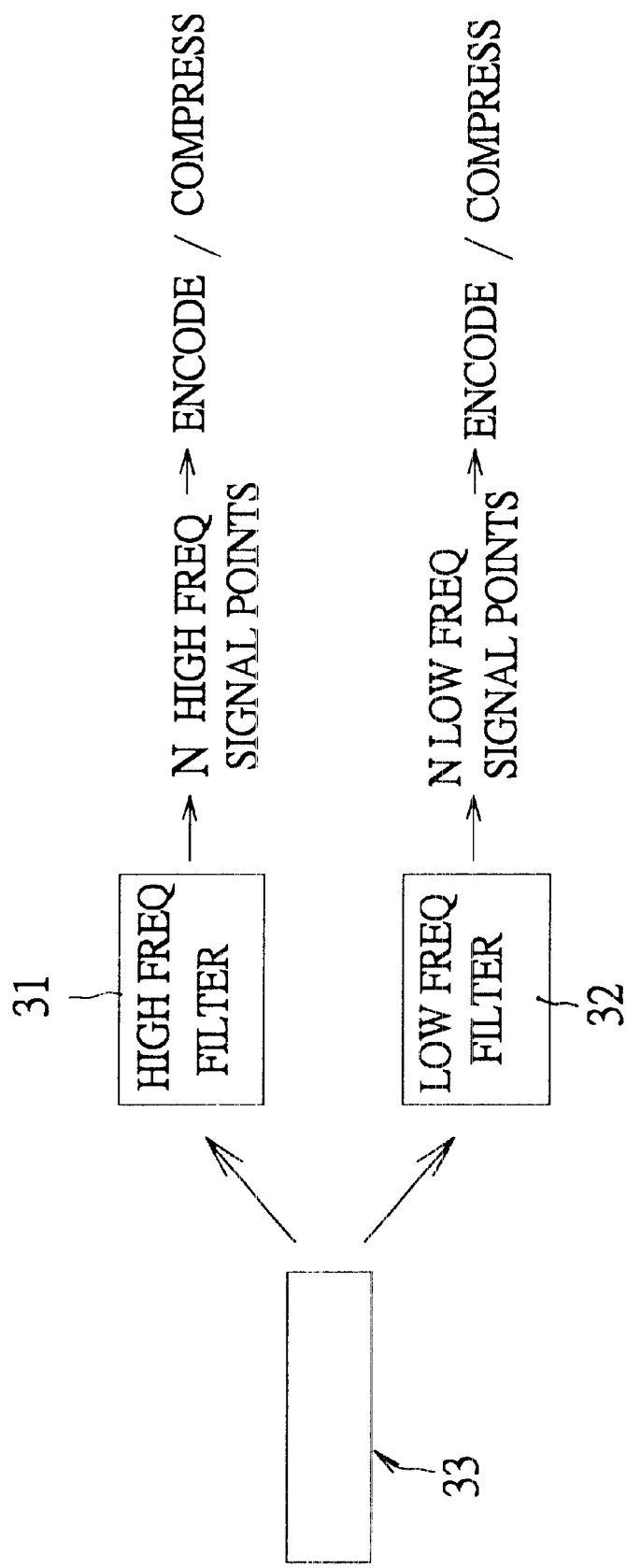
FIG. 3 schematically illustrates a conventional compression process for image signals.
Figure 4:
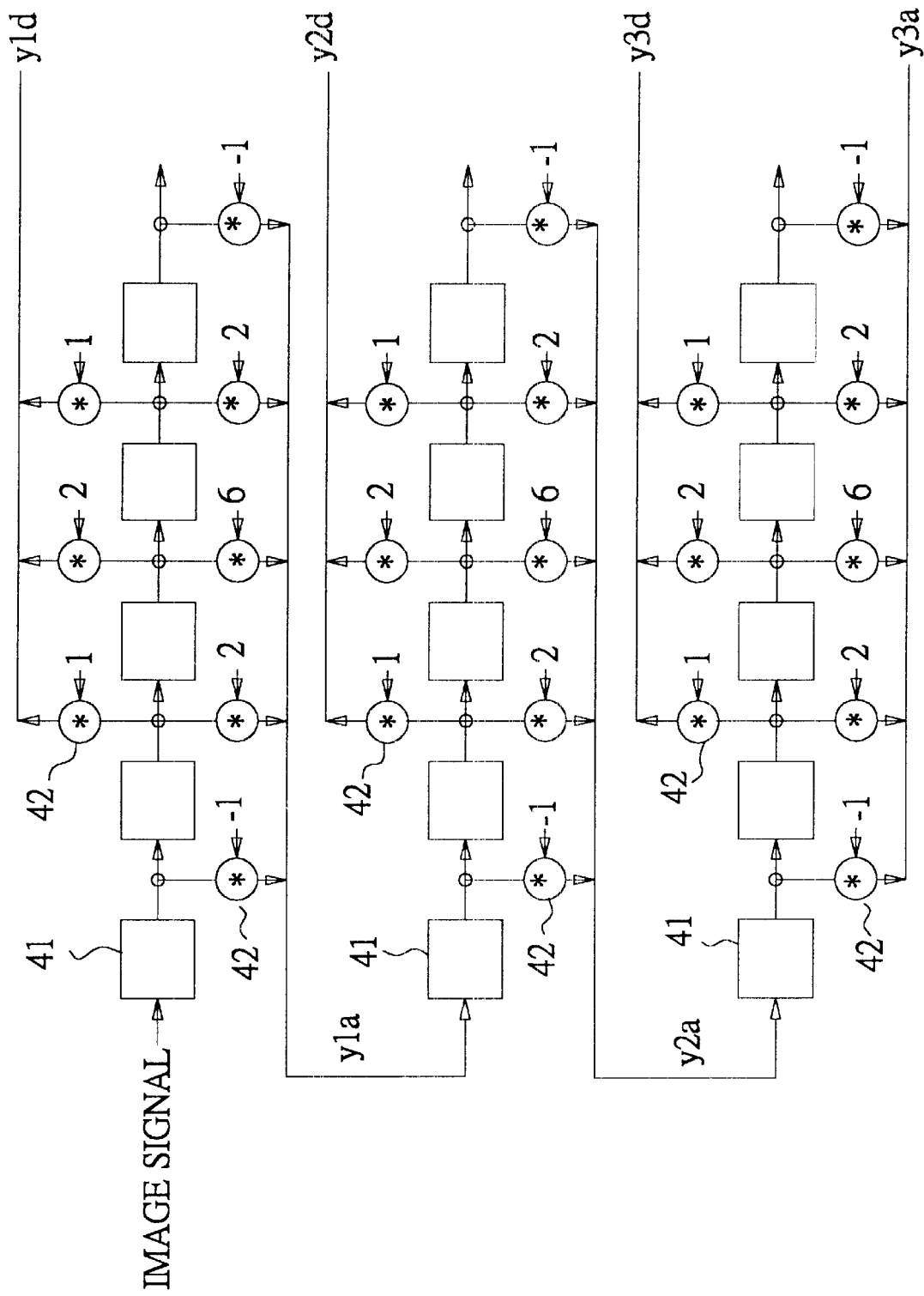
FIG. 4 is a schematic view showing the operating structure of a 3–5 wavelet filter.

To implement a 3–5 filter, with reference to FIG. 2, three identical sets of the aforementioned filtering circuits 1 are cascaded. As shown, the original image signal is input to the first filtering circuit 10 via the image input terminal 115. The low frequency component output terminal 128 of the first filtering circuit 10 is connected to the image input terminal 115' of the second filtering circuit 10'. Similarly, the low frequency component output terminal 128' of the second filtering circuit 10' is connected to the image input terminal 115" of the third filtering circuit 10". As such, the filtering outputs can be obtained from each of the high frequency component output terminals 118, 118', and 118" and the low frequency component output terminal 128" of the third filtering circuit 10".

Because each of the above filtering stages has the same circuitry, the 3–5 filter can be implemented by a simplified hardware structure. As to each stage of filtering circuit, the high frequency filtering circuit 11 only includes one adder 113 which is shared in both of the first and second operating cycles to obtain the high frequency components. The low frequency filtering circuit 12 utilizes the high frequency component generated by the high frequency filtering circuit 11 and one adder 123, which is also shared in both of the first and second operating cycles, to obtain the low frequency components. Therefore, only two adders are included and no complicated multiplier is required. In addition, there are only three latches required. Accordingly, only a total of 2×3=6 adders and 3×3=9 latches are required for a 3–5 filter, thereby effectively simplifying the circuit structure.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A filtering circuit for performing a high pass filtering and a low pass filtering on a plurality of input image data to obtain a high frequency component and a low frequency component corresponding to a current input image data, said filtering circuit comprising:

a first latch for holding the input image data and outputting the same;

a first adder for performing an addition between a previous input image data and a previous second input image data in a first operating cycle to obtain a first operation value, and performing an addition between the first operation value and a current input image data in a second operating cycle to obtain a high frequency component;

a second latch for holding the first operation value and the high frequency component from the first adder and outputting the same;

a second adder for performing an addition between a previous second high frequency component output from the second latch and the previous second input image data in the first operating cycle to obtain a second operation value, and performing an addition between the second operation value and a current high frequency component obtained in the first adder in the second operating cycle to obtain a low frequency component; and a third latch for holding the second operation value and outputting the same.

2. The filtering circuit as claimed in claim 1, further comprising a first multiplexer for selecting the previous input image data multiplied by a first coefficient to output to the first adder in the first operating cycle, and selecting the first operation value from the second latch to output to the first adder in the second operating cycle.

3. The filtering circuit as claimed in claim 2, further comprising a second multiplexer for selecting the previous second high frequency component from the second latch multiplied by a second coefficient to output to the second adder in the first operating cycle, and selecting the current high frequency component obtained from the first adder multiplied by a third coefficient to output to the second adder in the second operating cycle.

4. The filtering circuit as claimed in claim 3, further comprising a third multiplexer for selecting the previous second input image data multiplied by a fourth coefficient to output to the second adder in the first operating cycle, and selecting the second operation value from the third latch to output to the second adder in the second operating cycle.

5. The filtering circuit as claimed in claim 4, wherein the first coefficient is −2.

6. The filtering circuit as claimed in claim 4, wherein the second coefficient is −1.

7. The filtering circuit as claimed in claim 4, wherein the third coefficient is −1.

8. The filtering circuit as claimed in claim 4, wherein the fourth coefficient is 8.

\* \* \* \* \*